United States Patent
Shan et al.

(10) Patent No.: US 11,726,811 B2
(45) Date of Patent: Aug. 15, 2023

(54) PARALLEL CONTEXT SWITCHING FOR INTERRUPT HANDLING

(71) Applicant: VMware, Inc., Palo Alto, CA (US)

(72) Inventors: Yizhou Shan, San Diego, CA (US);
Marcos Kawazoe Aguilera, Mountain View, CA (US); Pratap Subrahmanyam, Saratoga, CA (US); Rajesh Venkatasubramanian, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 84 days.

(21) Appl. No.: 17/351,488

(22) Filed: Jun. 18, 2021

(65) Prior Publication Data

US 2022/0405121 A1 Dec. 22, 2022

(51) Int. Cl.
*G06F 9/46* (2006.01)
*G06F 9/48* (2006.01)
*G06F 9/54* (2006.01)

(52) U.S. Cl.
CPC ........... *G06F 9/4812* (2013.01); *G06F 9/461* (2013.01); *G06F 9/545* (2013.01)

(58) Field of Classification Search
CPC ......... G06F 9/4812; G06F 9/461; G06F 9/545
See application file for complete search history.

(56) References Cited

U.S. PATENT DOCUMENTS

| | | | | |
|---|---|---|---|---|
| 2002/0194389 A1* | 12/2002 | Worley, Jr. | ............ | G06F 9/4812 719/310 |
| 2005/0289542 A1* | 12/2005 | Uhlig | .................. | G06F 9/45533 718/1 |
| 2008/0162982 A1* | 7/2008 | Li | ........................ | G06F 9/5061 714/3 |
| 2013/0339963 A1* | 12/2013 | Greiner | ................. | G06F 9/3004 718/102 |
| 2021/0157601 A1* | 5/2021 | Craske | .................. | G06F 9/4812 |

FOREIGN PATENT DOCUMENTS

JP 2004531788 A * 10/2004

* cited by examiner

*Primary Examiner* — Emerson C Puente
*Assistant Examiner* — Jonathan R Labud
(74) *Attorney, Agent, or Firm* — Thomas Horstemeyer, LLP

(57) ABSTRACT

Disclosed are various embodiments for decreasing the amount of time spent processing interrupts by switching contexts in parallel with processing an interrupt. An interrupt request can be received during execution of a process in a less privileged user mode. Then, the current state of the process can be saved. Next, a switch from the less privileged mode to a more privileged mode can be made. The interrupt request is then processed while in the more privileged mode. Subsequently or in parallel, and possibly prior to completion of the processing the interrupt request, another switch from the more privileged mode to the less privileged mode can be made.

20 Claims, 4 Drawing Sheets

PARALLEL CONTEXT SWITCHING FOR INTERRUPT HANDLING

BACKGROUND

Computer systems often process interrupts, which cause the processor of the computer to transition execution from the current process executing in user mode to an interrupt handler that executes in kernel mode. Once the interrupt handler processes the interrupt, the processor can transition back from kernel mode to user mode and resume execution of the current process. There is significant overhead associated with the transition between user mode and kernel mode to process the interrupt due to the processor saving and restoring state with each transition.

Moreover, this overhead is becoming increasingly visible to applications and end users. For example, each transition between user mode and kernel mode can take hundreds of processor cycles. In the past, the interrupt handler may have required millions of processor cycles to execute. As a result, the cost associated with a transition was negligible in comparison to the cost of processing the interrupt itself. However, as interrupt handlers and peripheral devices have been optimized for performance, the number of processor cycles consumed to execute the interrupt handler has decreased. Moreover, recent security mitigations to protect against side-channel attacks have increased the amount of time and processor cycles spent switching between user mode and kernel mode to process an interrupt. As a result, the amount of time and processor cycles spent switching between user mode and kernel mode to process an interrupt has steadily grown from a negligible fraction of the time and processor cycles spent processing interrupts to a substantial fraction of the time and processor cycles spent processing interrupts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for implementing the context switch between user mode and kernel mode for handling an interrupt in parallel with execution of the interrupt handler. For example, when an interrupt request is received, the state of the current process can be saved and the processor can switch from user mode to kernel mode to execute an interrupt handler. Once the interrupt handler has begun execution, the processor can switch from kernel mode back to user mode in parallel while the interrupt handler continues execution. Once the interrupt handler completes execution, the previously executing process can resume execution in user mode without having to wait for the processor to switch from kernel mode to user mode. As a result, the perceived amount of time spent switching between user mode and kernel mode to process an interrupt is reduced because the processor has already switched contexts from kernel mode back to user mode prior to completion of the interrupt handler processing the interrupt.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1A:
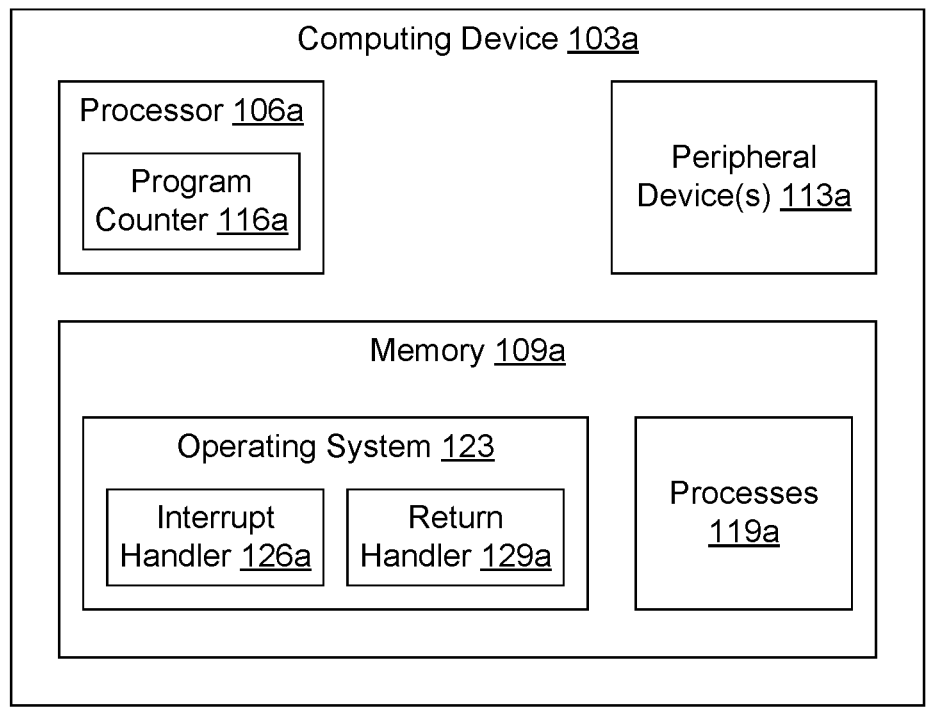
FIG. 1A is a drawing depicting several embodiments of the present disclosure.

FIG. 1A depicts a schematic block diagram of one example of a computing device 103a according to various embodiments of the present disclosure. The computing device 103a can include one or more processors 106a. The computing device 103a can also have a memory 109a. The computing device 103a can also have one or more peripheral devices 113a attached to a bus or interconnect, allowing the peripheral devices 113a to be in data connection with the processor 106a and/or memory 109a.

The processor 106a can represent any circuit or combination of circuits that can execute one or more machine-readable instructions stored in the memory 109a that make up a computer program or process and store the results of the execution of the machine-readable instructions in the memory 109a. The processor 106a can also be configured to receive data from or send commands to one or more peripheral devices 113a. In some implementations, the processor 106a may be configured to perform one or more machine-readable instructions in parallel or out of order. This could be done if the processor 106a includes multiple processor cores and/or additional circuitry that supports simultaneous multithreading (SMT). Examples of a processor 106a can include a central processing unit (CPU), a graphics processing unit (GPU), a field-programmable gate array (FPGA), application specific integrated circuits (ASICs), etc.

The processor 106a can include one or more registers that can be used to store various values or types of data. For example, the processor 106a could include a program counter 116a, which is a register that stores the location in the memory 109a of the next instruction to be executed for a program or process 119a. The program counter 116a may also be referred to as the instruction pointer (e.g., for INTEL x86 and ITANIUM microprocessors), the instruction counter, or the instruction address register.

The memory 109a can include both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Various types of data and machine-readable instructions may be stored in the memory 109a. For example, one or more processes 119a may be stored in the memory 109a. In some implementations, an operating system 123 may also be stored in the memory 109a.

A process 119a can represent a collection of machine-readable instructions stored in the memory 109a that, when executed by the processor 106a of the computing device 103a, cause the computing device 103a to perform one or more tasks. A process 119a can represent a program, a sub-routine or sub-component of a program, a library used by one or more programs, etc. When a process requests access to a hardware or software resource for which it lacks permission to interact with, the process 119a can generate an interrupt and provide or send the interrupt to the operating system 123.

The operating system 123 can include any system software that manages the operation of computer hardware and software resources of the computing device 103a. The operating system 123 can also provide various services or functions to computer programs, such as processes 119a, that are executed by the computing device 103a. Accordingly, the operating system 123 may schedule the operation of tasks or processes 119a by the processor 106a, act as an intermediary between processes 119a and hardware of the computing device, such as peripheral devices 113a. The operating system 123 may also implement and/or enforce various security safeguards and mechanisms to prevent access to hardware or software resources by unprivileged or unauthorized users or processes 119a. The operating system 123 can also provide one or more interrupt handlers 126a and one or more return handlers 129a for processing interrupts received from peripheral devices 113a or processes 119a.

The interrupt handler 126a represents a set of machine-readable instructions provided by the operating system 123 that are associated with a particular interrupt condition. Interrupt handlers 126a can be implemented to process hardware interrupts, software interrupts, or software exceptions. Often, interrupt handlers 126a are executed with elevated privileges by the operating system 123, such as kernel mode, in order to access or interact with hardware resources that are otherwise inaccessible to processes 119a operating in a less privileged mode, such as user mode. For example, in the INTEL x86 and INTEL x86-64 microarchitectures, the interrupt handler 126a could be executed within privilege ring 0 or privilege ring −1, often referred to as kernel mode or hypervisor mode respectively, while the process that triggered the interrupt could be executed in within a less privileged mode, such as privilege ring 3 of the INTEL x86 or INTEL x86-64 microarchitecture, often referred to as user mode.

The return handler 129a can be implemented by the operating system 123 to provide a return point for an interrupt handler 126a once the interrupt handler 126a completes execution. For example, the return handler 129a could be configured to monitor a completion flag associated with the interrupt handler 126a and return execution to the process 119a or peripheral device 113a that generated the interrupt. The return handler 129a can be configured to use direct jumps or similar assembly instructions instead of indirect jumps or similar assembly instructions in order make use of pipelining and out-of-order execution features provided by some processors 106a.

The peripheral devices 113a represent auxiliary devices or storage devices used to provide information to or receive information from the computing device 103a. Accordingly, peripheral devices 113a can refer to any hardware component that is attached to the computing device 103a and is controlled by the computing device 103a or the operating system 123. Examples of peripheral devices 113a include input devices, which provide data or instructions to the processor 106a, output devices, which receive data from the processor 106a, and input/output devices which perform both input and output functions. Examples of input devices include mice, keyboards, microphones, cameras, touchscreens, trackpads, etc. Examples of output devices include displays, printers, speakers, etc. Examples of input/output devices include network adapters (e.g., WiFi interfaces, BLUETOOTH interfaces, Ethernet network interfaces, etc.) and storage devices (e.g., solid state drives (SSDs), hard disk drives (HDDs), optical drives, universal serial bus (USB) flash drives, etc.).

Figure 1B:
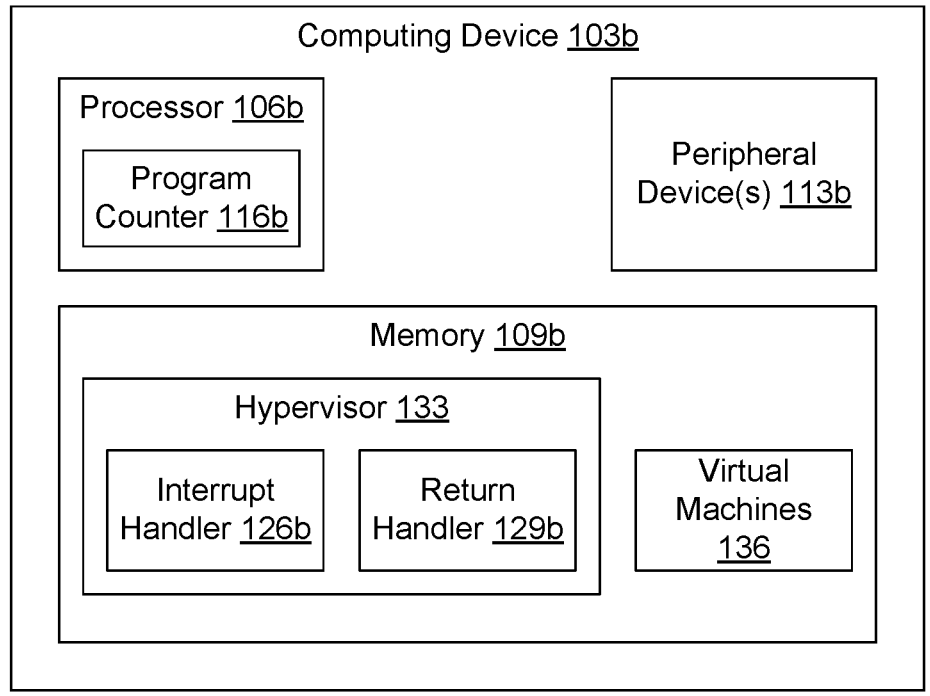
FIG. 1B is a drawing depicting several embodiments of the present disclosure.

FIG. 1B depicts a schematic block diagram of one example of a computing device 103b according to various embodiments of the present disclosure. Like the computing device 103a, the computing device 103b contains a processor 106b, memory 109b and one or more peripheral devices 113b, which function similarly to the previously described processor 106a, memory 109a, and peripheral devices 113a. Stored in the memory 109b is a hypervisor 133, which manages one or more virtual machines 136.

The hypervisor 133, which may sometimes be referred to as a virtual machine monitor (VMM), is an application or software stack that allows for creating and running virtual machines 136. Accordingly, a hypervisor 133 can be configured to provide guest operating systems with a virtual operating platform, including virtualized hardware devices or resources, and manage the execution of guest operating systems within a virtual machine execution space provided by the hypervisor 133. In some instances, a hypervisor 133 may be configured to run directly on the hardware of the host computing device 103b in order to control and manage the hardware resources of the host computing device 103b provided to the virtual machines 136 resident on the host computing device 103b. In other instances, the hypervisor 133 can be implemented as an application executed by an operating system executed by the host computing device 103b, in which case the virtual machines 136 may run as a thread, task, or process of the hypervisor 133 or operating system. Examples of different types of hypervisors 133 include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

The hypervisor 133 can cause one or more processes, threads, or subroutines to execute in order to provide an appropriate level of functionality to individual virtual machines 136. For example, some instances of a hypervisor 133 could spawn individual host processes 119 to manage the execution of respective virtual machines 136. In other instances, however, the hypervisor 133 could manage the execution of all virtual machines 136 hosted by the hypervisor 133 using a single process.

The virtual machines 136 can represent software emulations of computer systems. Accordingly, a virtual machine 136 can provide the functionality of a physical computer sufficient to allow for installation and execution of an entire operating system and any applications that are supported or executable by the operating system. As a result, a virtual machine 136 can be used as a substitute for a physical machine.

When a virtual machine 136 attempts to access a peripheral device 113b of the host computing device 103b, or a service provided by the hypervisor 133, the virtual machine 136 can generate an interrupt that is provided to the hypervisor 133. These interrupts generated by the virtual machines 136 may be referred to by other terms, such as vmexit events. Accordingly, the hypervisor 133 may implement or execute an interrupt handler 126b that operates in the same or a similar manner as the interrupt handler 126a, as described in the discussion of FIG. 1A. Likewise, the hypervisor 133 could also implement one or more return handlers 129b, which operate in the same or a similar manner as the return handlers 129a as described in the discussion of FIG. 1A.

Figure 2A:
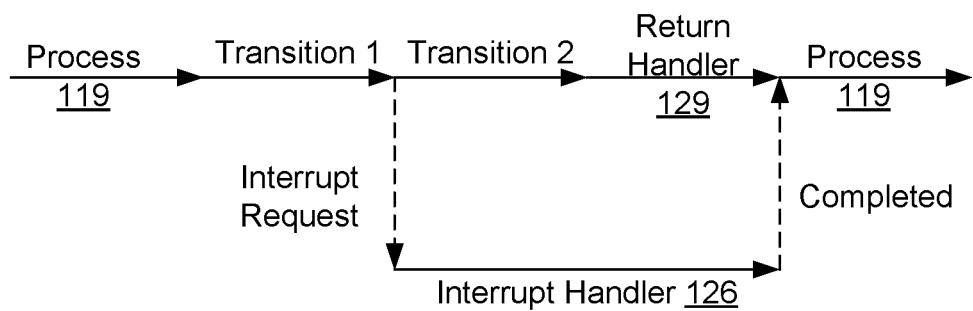
FIG. 2A is a line drawing depicting the operation of the various embodiments of the present disclosure.
Figure 2B:
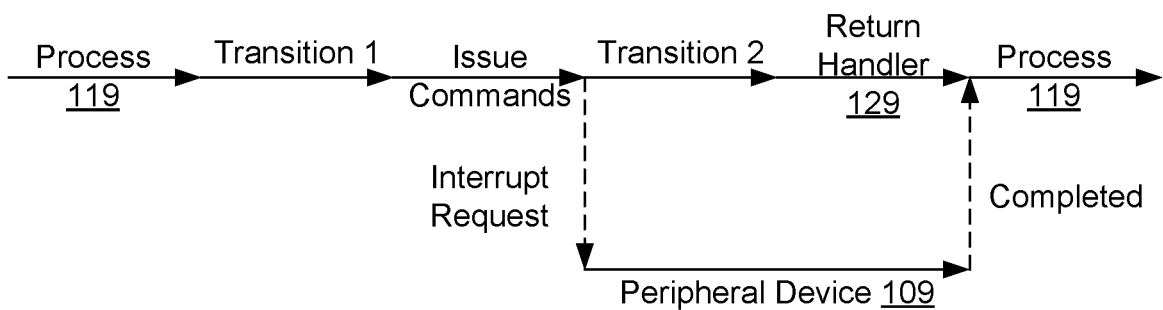
FIG. 2B is a line drawing depicting the operation of the various embodiments of the present disclosure.

FIG. 2A and FIG. 2B are graphical depictions of different implementations of various embodiments of the present disclosure. More detailed descriptions of the specific steps implemented by the components identified in FIG. 2A and FIG. 2B are described in flow charts illustrated in FIGS. 3 and 4.

FIG. 2A depicts the parallel execution of an interrupt handler 126a or interrupt handler 126b (individually and collectively interrupt handler(s) 126). As shown, a process 119 can generate an interrupt request, which when handled by the processor 106a or 106b, causes a first transition of the operation of the computing device 103a or computing device 103b (individually and collectively "computing device 103") from a less privileged execution mode used for the process 119 (e.g., user mode) to a more privileged execution mode (e.g., kernel mode). After the first transition is complete, the operating system 123 can provide the interrupt request to an interrupt handler 126 for further processing. While the interrupt handler 126 processes the interrupt, the operating system 123 can initiate a second transition from the more privileged execution mode back to the less privileged execution mode. Once the second transition is complete, a return handler 129a or 129b (individually and collectively return handler(s) 129) begins execution to monitor the status of the interrupt handler 126. Once the return handler 129 determines that the interrupt handler 126 has completed processing of the interrupt, the return handler 129 can then cause the process 119 that generated the interrupt to resume operation. As a result, the transition from the more privileged execution mode (e.g., kernel mode) back to the less privileged execution mode (e.g., user mode) is performed in parallel with execution of the interrupt handler 126, thereby shortening the total time spent processing the interrupt. In some implementations, the return handler 129 may be executed on a separate processor 106 in a multi-processor system or a separate core of a multi-core processor 106 than the interrupt handler 126 because the return handler 129 will execute in the less privileged mode and the interrupt handler 126 will continue to execute in the more privileged mode.

Although the description of FIG. 2A describes how an interrupt generated by a process 119 can be addressed using an interrupt handler 126 and a return handler 129 provided by an operating system 123, it should be noted that the same process could be used to improve the performance of interrupts generated by virtual machines 136 and provided to a hypervisor 133 or interrupts generated by a peripheral device 113 and provided to the operating system 123.

FIG. 2B depicts the parallel execution of an interrupt handler 126a or interrupt handler 126b (individually and collectively interrupt handler(s) 126). As shown, a process 119 can generate an interrupt request, which when handled by the processor 106a or 106b, causes a first transition of the operation of the computing device 103a or computing device 103b (individually and collectively computing device(s) 103) from a less privileged execution mode used for the process 119 (e.g., user mode) to more privileged execution mode (e.g., kernel mode). After the first transition is complete, the operating system 123 can issue one or more commands to a peripheral device 113a or peripheral device 113b (individually and collectively "peripheral device(s) 113) of the computing device 103. For example, the operating system 123 could issue one or more input/output (IO) commands to a storage device or network adapter installed on the computing device 103, which may take some time to process.

While the peripheral device 113 processes the commands, the operating system 123 can initiate a second transition from the more privileged execution mode back to the less privileged execution mode. Once the second transition is complete, a return handler 129a or 129b (individually and collectively return handler(s) 129) can begin execution to monitor the status of the commands being processed by the peripheral device 113. Once the return handler 129 determines that the peripheral device 109 has completed processing the commands, the return handler 129 can then cause the process 119 that generated the interrupt to resume operation. As a result, the transition from the more privileged execution mode (e.g., kernel mode) back to the less privileged execution mode (e.g., user mode) is performed in parallel with execution of the commands sent to the peripheral device 113, thereby shortening the total time spent processing the interrupt.

Although the description of FIG. 2B describes how an interrupt generated by a process 119 can be processed by a peripheral device 113 and a return handler 129 provided by an operating system 123, it should be noted that the same process could be used to improve the performance of interrupts generated by virtual machines 136 and provided to a hypervisor 133 to access one or more peripheral devices 113 or perform other IO tasks.

Figure 3:
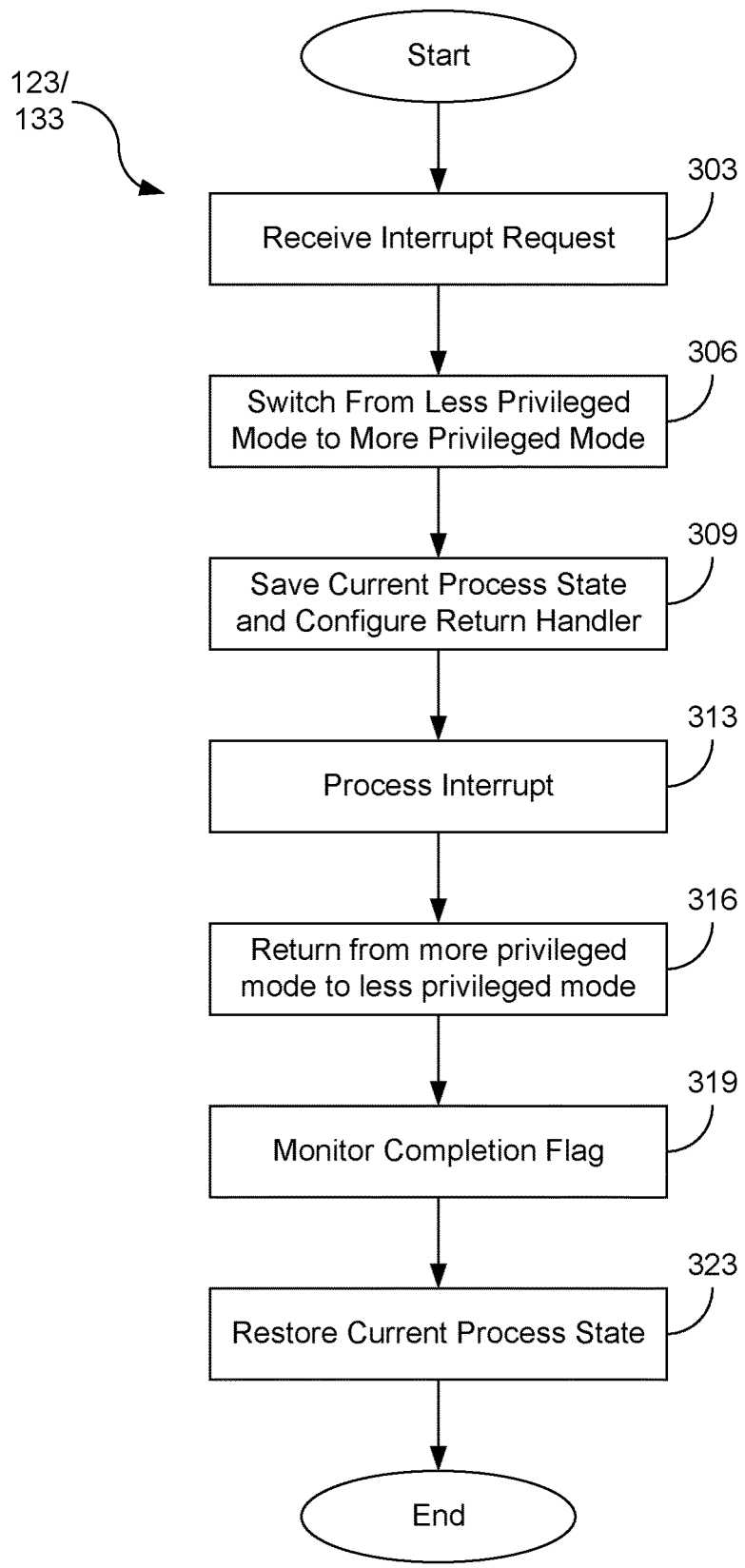
FIG. 3 is a flowchart illustrating one example of functionality implemented as portions of an operating system or hypervisor according to various embodiments of the present disclosure.

FIG. 3 shown is a flowchart that provides one example of the operation of a portion of the operating system 123 or hypervisor 133 according to various embodiments of the present disclosure. The flowchart of FIG. 3 provides merely an example of the many different types of functional arrangements that can be employed to implement the operation of the depicted portion of the operating system 123 or hypervisor 133. As an alternative, the flowchart of FIG. 3 can be viewed as depicting an example of elements of a method implemented using a computing device 103a or 103b (collectively and individually "computing device(s) 103").

Beginning with block 303, the operating system 123 or hypervisor 133 can receive an interrupt request. For example, a currently executing process 119 or virtual machine 136 could generate an interrupt request to access a hardware resource (e.g., a peripheral device 113) or execute a system call for a service provided by the operating system 123 or hypervisor 133. However, interrupt requests could also be received from other sources, such as the operating system 123 or hypervisor 133 itself (e.g., due to system timers or system events), other concurrently executing processes 119 or virtual machines 136, and/or peripheral devices 113 or other hardware resources.

Next at block 306 the processor 106 can switch from a less privileged mode in which the process 119 or virtual machine 136 was executing to a more privileged mode. For example, if the processor 106 were an INTEL or AMD processor implementing a version of the x86 or x86-64 instruction set, the processor 106 could switch from a user mode (e.g., ring 3) to a kernel mode (e.g., ring 0) or hypervisor mode (e.g., ring −1).

Then, at block 309, the operating system 123 or hypervisor 133 can save the current state of the process 119 or virtual machine 136 that is currently executing. For example, the operating system 123 or hypervisor 133 could save the current register values used by the process 119 or virtual machine 136 to a stack in the memory 109 of the computing device 103. The operating system 123 or hypervisor 133 could further save the value of the program counter 116 to a saved address location in the memory 109 of the computing device 103. The operating system 123 or hypervisor 133 could then instantiate a return handler 129, and provide the return handler 129 with the saved address location for the value of the program counter 116 and the locations of the saved register values in the stack.

Moving on to block 313, the operating system 123 or hypervisor 133 can cause the interrupt to be processed in response to the switch from the less-privileged mode to the more privileged mode completing. This can be done through a number of approaches. In some instances, the operating system 123 or hypervisor 133 could initiate an interrupt handler 126 to process the interrupt. This might be done in order to execute a system call provided by the operating system on behalf of the process 119 or virtual machine 136. In other instances, the operating system 123 or hypervisor 133 could issue commands directly to a peripheral device 113 in order to process the interrupt. For example, if the interrupt were generated by a process 119 or virtual machine 136 to send data across the network or read to or write from a storage device (e.g., a disk drive), the operating system 123 or hypervisor 133 could issue the commands to the network adapter or storage device (e.g., a disk drive) directly.

When the interrupt handler 126 or peripheral device 113 completes processing of the interrupt, the interrupt handler 126 or peripheral device 113 can then update a completion flag associated with the interrupt. The completion flag can be represented as a Boolean variable that represents whether the interrupt handler 126 or peripheral device 119 has completed processing of the interrupt. Upon completion, the interrupt handler 126 or peripheral device 113 can change the value of the Boolean variable (e.g., from false to true).

Meanwhile, proceeding to block 316, the operating system 123 or hypervisor 133 can return from the more privileged mode to the less privileged mode in response. The second context switch from the more privileged mode back to the less privileged mode can be initiated independently from, and concurrently to, the interrupt handler 126 or peripheral device 113 processing the interrupt. Depending on how long the interrupt handler 126 or peripheral device 113 takes to process the interrupt, the second context switch from the more privileged mode back to the less privileged mode could be completed prior to the interrupt handler 126 or peripheral device 113 completing processing the interrupt. Once the processor 106 returns to the less privileged mode, execution is resumed by the return handler 129 instead of the process 119 or virtual machine 136 that was interrupted.

Next at block 319, the operating system 123 or hypervisor 133 can monitor a completion flag to determine when or whether the interrupt handler 126 or peripheral device 113 has completed processing the interrupt. This monitoring can be performed by the return handler 129 in some implementations. In these implementations, the return handler 129 could repeatedly or continuously poll the status of the completion flag. When the value of the completion flag changes (e.g., from false to true), then the return handler 129 could conclude that the interrupt handler 126 has completed processing the interrupt.

Then, at block 323, the operating system 123 or hypervisor 133 can restore the current state saved at block 306 of the process 119 or virtual machine 136, thereby allowing the process 119 or virtual machine 136 to continue execution. For example, the return handler 129 could restore the previously saved register values of the processor 106 from the stack in the memory 109. The return handler 129 could then cause execution to proceed to the saved value of the program counter 116, thereby causing the previous process 119 or virtual machine 136 to continue execution from its previously saved state. Once the process 119 or virtual machine resumes execution, the described process can end.

Figure 4:
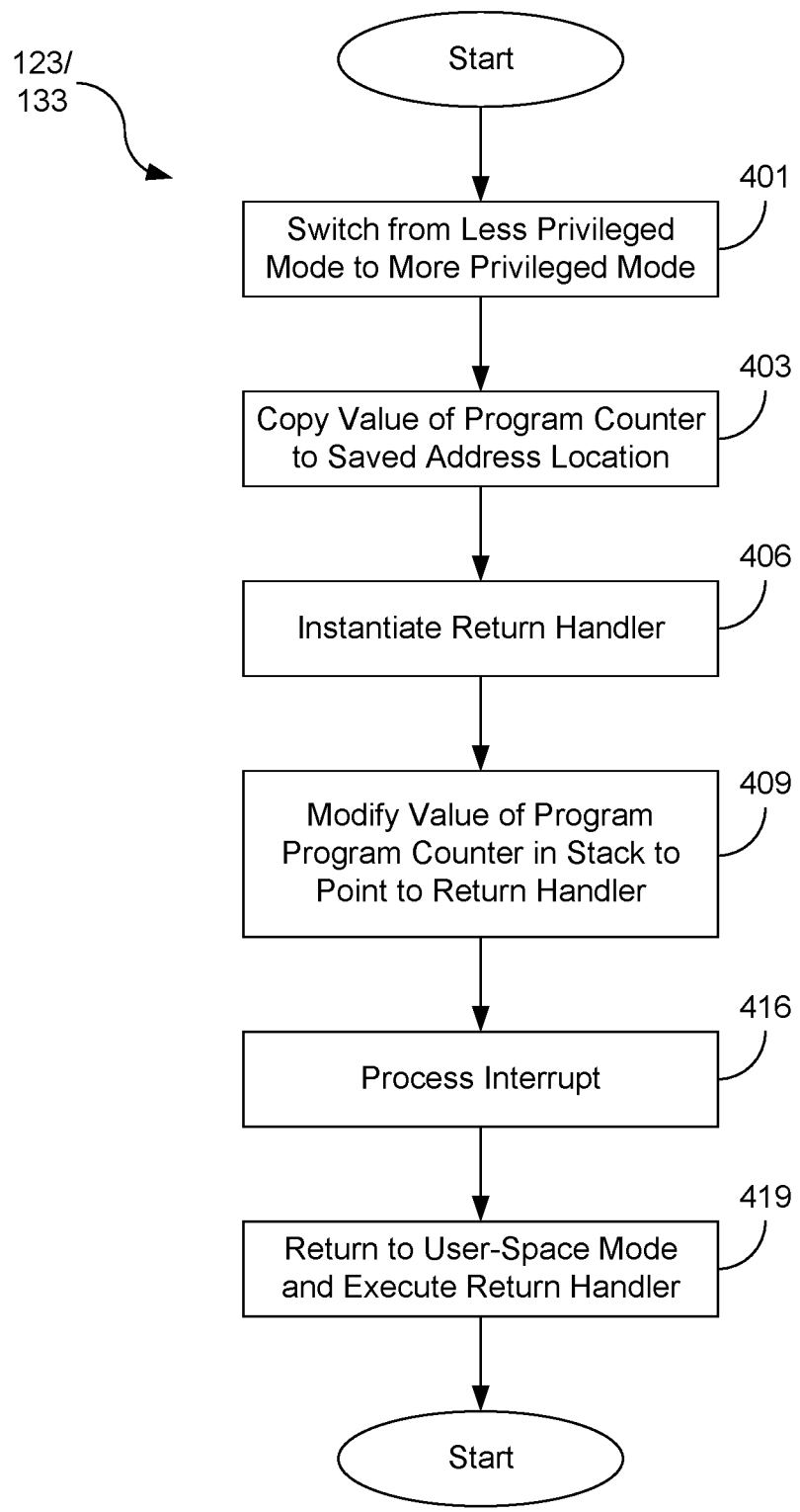
FIG. 4 is a flowchart illustrating one example of functionality implemented as portions of an operating system or hypervisor according to various embodiments of the present disclosure.

FIG. 4 shown is a flowchart that provides one example of the operation of a portion of the operating system 123 or hypervisor 133. In particular, the flowchart of FIG. 4 describes in additional detail how the return handler 129 can be instantiated, configured, and executed in order to provide the functionality used by the return handler 129 in various embodiments of the present disclosure, and provides additional detail regarding the implementation of blocks 306, 309, 313, and 316, as described in FIG. 3. As an alternative, the flowchart of FIG. 4 can be viewed as depicting an example of elements of a method implemented within the computing device 103.

Beginning at block 401, the processor 106 can switch from the less privileged mode to the more privileged mode of execution. The processor 106 can also save the current value of the program counter 116 and the current values of the registers of the processor to a stack in the memory 109 of the computing device 103.

Then at block 403, the operating system 123 or hypervisor 133 can copy the value of the program counter 116 saved to the stack in the memory 109 to a saved address location in the memory 109. This could be done, for example, in response to the operating system 123 or hypervisor 133 receiving an interrupt, as previously described. Copying the value of the program counter 116 is performed to preserve the value for when the return handler executes so that, when the processor 106 performs a second switch to return from the more privileged mode to the less privileged mode to resume execution of the interrupted process 119 or virtual machine 136, execution will resume with the return handler 129 instead Next at block 406, the operating system 123 or hypervisor 133 can instantiate the return handler 129. This can be done using several approaches. In one approach, a return handler 129 could be created and provided with the saved address location in the memory 109 where the stored value of the program counter 116 is located. Using this approach, the return handler 129 could be provided with the saved address location as an argument or parameter upon initiation. When the return handler 129 determines that the interrupt handler 126 has completed execution, the return handler 129 could then load the value stored in the saved address location and set the program counter 116 to the value, thereby causing the interrupted process 119 or virtual machine 136 to resume execution. This approach may be referred to as an indirect jump approach. In another approach, a return handler 129 could be generated, created, or otherwise constructed and the value of the program counter 116 stored in the saved address location could be retrieved and hard-coded into an instance of the return handler 129. In this approach, when the return handler 129 determines that the interrupt handler 126 has completed execution, the return handler 129 could update the program counter 116 with the hardcoded value embedded in the return handler 129. This approach may be referred to as a direct jump approach.

There are advantages and disadvantages to each approach. For example, approaches that use indirect jumps may be easier to program. However, processors are unable to utilize speculative execution performance enhancements such as branch prediction or out-of-order execution for these implementations because the processor 106 is unable to predict the value of the program counter 116 stored in the saved address location in the memory 109. In contrast, approaches that use direct jumps, while more difficult to program, can utilize speculative execution performance enhancements such as branch prediction or out-of-order execution because the processor 106 knows the value of the program counter 116 since it is hard-coded into the return handler 129.

Moving on to block 409, the operating system 123 or hypervisor 133 can modify the value of the program counter 116 saved to the stack to point to the address of the return handler 129 instantiated at block 406. This can be done so that, when the operating system 123 or hypervisor 133 performs a switch from a more privileged mode back to a less privileged mode at block 419, execution will resume with the return handler 129, which can then return execution to the interrupted process 119 or virtual machine 136 once the interrupt handler 126 completes processing of the interrupt.

Then, at block 416, the operating system 123 or hypervisor 133 can process the interrupt while the processor is in the more privileged mode. For example, the interrupt handler 126 can issue input/output commands to a peripheral device 113. As another example, the interrupt handler 126 could execute a system call or similar function provided by the operating system 123 or hypervisor 133.

In parallel to processing the interrupt at block 416, the operating system 123 or hypervisor 133 can, at block 419, initiate a switch back to the less privileged mode from the more privileged mode. As part of the switch, the program counter 116 can be restored to the value of the program counter 116 that is currently saved in the stack, as well as the values of the processor registers. This causes the processor 106 to begin execution of the return handler 129, which can monitor the completion flag as previously described in order to eventually cause the processor 106 to resume execution of the interrupted process 119 or virtual machine 136.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including persistent memory, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include persistent memory, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a persistent memory, read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
 a computing device comprising a processor and a memory; and
 machine-readable instructions stored in the memory that, when executed by the processor, cause the computing device to at least:
  receive an interrupt request during execution of a process in a less privileged mode;
  save a current state of the process;
  switch from the less privileged mode to a more privileged mode;
  process the interrupt request while in the more privileged mode; and
  prior to completion of processing the interrupt request:
   switch from the more privileged mode to the less privileged mode; and
   in parallel to processing the interrupt request, continue execution of the process in the less privileged mode.

2. The system of claim 1, wherein the machine-readable instructions, when executed by the processor of the computing device, further cause the computing device to at least:
 monitor a completion flag associated with the processing of the interrupt request to determine whether the processing of the interrupt request has completed; and
 in response to a determination that processing of the interrupt request has completed, restore the current state of the process.

3. The system of claim 1, wherein the machine-readable instructions that cause the computing device to process the interrupt request while in the more privileged mode further cause the computing device to initiate an interrupt handler thread, wherein the interrupt handler thread performs one or more operations associated with the interrupt request.

4. The system of claim 1, wherein the machine-readable instructions that cause the computing device to process the interrupt request while in the more privileged mode further cause the computing device to issue one or more commands to a peripheral device installed in the computing device.

5. The system of claim 1, wherein the current state of the process includes a first value of a program counter and the machine-readable instructions that cause the computing device to save the current state of the process further cause the computing device to at least
 save the first value of the program counter to a saved address location; and
 replace the first value of the program counter with a second value representing an address for a return handler.

6. The system of claim 5, wherein the machine-readable instructions further cause the computing device to at least provide the first value of the program counter as an argument to the return handler.

7. The system of claim 5, wherein the first value of the program counter is hard-coded in the return handler.

8. A computer-implemented method, comprising:
receiving an interrupt request during execution of a process in a less privileged mode;
saving a current state of the process;
switching from the less privileged mode to a more privileged mode;
process the interrupt request while in the more privileged mode; and
prior to completion of processing the interrupt request:
switching from the more privileged mode to the less privileged mode; and
in parallel to processing the interrupt request, continuing execution of the process in the less privileged mode.

9. The computer-implemented method of claim 8, further comprising:
monitoring a completion flag associated with the processing of the interrupt request to determine whether the processing of the interrupt request has completed; and
in response to determining that processing of the interrupt request has completed, restoring the current state of the process.

10. The computer-implemented method of claim 8, wherein processing the interrupt request while in the more privileged mode further comprises initiating an interrupt handler thread, wherein the interrupt handler thread performs one or more operations associated with the interrupt request.

11. The computer-implemented method of claim 8, wherein processing the interrupt request while in the more privileged mode further comprises issuing one or more commands to a peripheral device.

12. The computer-implemented method of claim 8, wherein the current state of the process includes a first value of a program counter and saving the current state of the process further comprises:
saving the first value of the program counter to a saved address location; and
replacing the first value of the program counter with a second value representing an address for a return handler.

13. The computer-implemented method of claim 12, further comprising providing the first value of the program counter as an argument to the return handler.

14. The computer-implemented method of claim 12, wherein the first value of the program counter is hard-coded in the return handler.

15. A non-transitory, computer-readable medium, comprising machine-readable instructions that, when executed by a processor of a computing device, cause the computing device to at least:
receive an interrupt request during execution of a process in a less privileged mode;
save a current state of the process;
switch from the less privileged mode to a more privileged mode;
process the interrupt request while in the more privileged mode; and
prior to completion of processing the interrupt request:
switch from the more privileged mode to the less privileged mode; and
in parallel to processing the interrupt request, continue execution of the process in the less privileged mode.

16. The non-transitory, computer-readable medium of claim 15, wherein the machine-readable instructions, when executed by the processor of the computing device, further cause the computing device to at least:
monitor a completion flag associated with the processing of the interrupt request to determine whether the processing of the interrupt request has completed; and
in response to a determination that processing of the interrupt request has completed, restore the current state of the process.

17. The non-transitory, computer-readable medium of claim 15, wherein the machine-readable instructions that cause the computing device to process the interrupt request while in the more privileged mode further cause the computing device to initiate an interrupt handler thread, wherein the interrupt handler thread performs one or more operations associated with the interrupt request.

18. The non-transitory, computer-readable medium of claim 15, wherein the machine-readable instructions that cause the computing device to process the interrupt request while in the more privileged mode further cause the computing device to issue one or more commands to a peripheral device installed in the computing device.

19. The non-transitory, computer-readable medium of claim 15, wherein the current state of the process includes a first value of a program counter and the machine-readable instructions that cause the computing device to save the current state of the process further cause the computing device to at least:
save the first value of the program counter to a saved address location; and
replace the first value of the program counter with a second value representing an address for a return handler.

20. The non-transitory, computer-readable medium of claim 15, wherein the machine-readable instructions further cause the computing device to at least
generate the return handler, wherein the first value of the program counter is hard-coded in the return handler.

* * * * *